US006834642B2

(12) United States Patent
Ichinohe

(10) Patent No.: US 6,834,642 B2
(45) Date of Patent: Dec. 28, 2004

(54) FUEL VAPOR PROCESSING APPARATUS

(75) Inventor: Katsuyuki Ichinohe, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/745,376

(22) Filed: Dec. 22, 2003

(65) Prior Publication Data

US 2004/0134561 A1 Jul. 15, 2004

(30) Foreign Application Priority Data

Dec. 27, 2002 (JP) ....................................... 2002-381968
Mar. 28, 2003 (JP) ....................................... 2003-090741

(51) Int. Cl.[7] ......................... F02M 59/00; B60K 15/77

(52) U.S. Cl. ....................... 123/518; 123/519; 137/197; 137/587

(58) Field of Search ................................ 123/516, 518, 123/519, 520; 137/587, 588, 197, 200

(56) References Cited

U.S. PATENT DOCUMENTS 4,872,439 A 10/1989 Sonoda et al.
5,413,137 A * 5/1995 Gimby ....................... 137/200
2002/0074059 A1 * 6/2002 Schaefer et al. ............ 141/325
2002/0144730 A1 10/2002 Brock et al.

FOREIGN PATENT DOCUMENTS

JP 2000-203282 A1 7/2000

* cited by examiner

*Primary Examiner*—Thomas Moulis
(74) *Attorney, Agent, or Firm*—Darby & Darby

(57) ABSTRACT

A fuel cut valve is disposed at a higher position than a fill up level in a fuel tank and communicates with an evaporative passage communicating between the fuel tank and a canister through an orifice. Further, a volume chamber is disposed at a higher position than the filling up level in the fuel tank and communicates with the evaporative passage downstream of the orifice. Further, a liquid level restricting valve is disposed in the vicinity of the fill up level and communicates with the evaporative passage through the volume chamber. When the liquid level of fuel reaches the fill up level at refueling, the liquid level restricting valve is closed to prevent overfilling of fuel by restricting the volume of the fuel vapor passing through the orifice. During traveling of a vehicle, fuel vapor is fed to the canister through the fuel cut valve and the liquid level restricting valve.

3 Claims, 3 Drawing Sheets

FUEL VAPOR PROCESSING APPARATUS

BACKGROUND OF THE INVENTION

Field of the Invention

The present invention relates to a fuel vapor processing apparatus for guiding fuel vapor generated in a fuel tank to a carbon canister and more particularly to a fuel vapor processing apparatus having a function to prevent a fuel tank from being over-filled during refueling.

As disclosed in Japanese Patent Application Laid-open No. Toku-Kai 2000-203282, the fuel vapor processing apparatus comprises an evaporative line (evaporative passage) for releasing the inner pressure of a fuel tank increased by the fuel vapor (evaporative gas) generated during traveling of a vehicle, a vent line (vent passage) for releasing the inner pressure increased by the fuel vapor generated during refueling and a vent switching valve for selectively opening onto the carbon canister (hereinafter referred to as just canister). The vent switching valve connects the evaporative passage with the canister when a fuel filler cap is closed and connects the vent passage with the canister.

In thus constituted fuel vapor processing apparatus, the evaporative passage communicates with the fuel tank through a fuel cut valve (FCV) provided above a fill up level. Further, in case where a vehicle body is slanted or in other cases, the fuel cut valve is closed to prevent fuel from flowing out from the fuel tank to the canister.

On the other hand, the vent passage communicates with the fuel tank through a liquid level restricting valve (fill up valve). When the liquid level of fuel reaches the fill up level at refueling, the liquid level restricting valve is closed. As a result, the inner pressure of the fuel tank rises, increasing the liquid level in the fuel filler pipe and preventing the fuel tank from being overfilled.

This type of the fuel vapor processing apparatus is strictly required to prevent evaporative gas from leaking out side. In order to realize the prevention of the leakage of evaporative gas with high reliability, it is desirable that the length of pipes having possibilities of leakage is shortened as far as possible, the number of connections is reduced, and the passage connecting the fuel tank and the canister is simplified.

However, the fuel cut valve for preventing fuel from flowing out during traveling and the liquid level restricting valve for preventing overfilling during refueling have an independent function, respectively and further these two valves communicate to two different lines of passages (evaporative passage and vent passage), respectively. Hence, it has been difficult to simplify the construction of the fuel vapor processing apparatus of this kind.

SUMMARY OF THE INVENTION

It is an object of the present invention to provide a fuel vapor processing apparatus capable of fulfilling two functions, that is, processing a fuel vapor generated at refueling and processing a fuel vapor generated during traveling of a vehicle, with a single evaporative passage line.

In order to attain the object, a fuel vapor processing apparatus comprises a canister for collecting the fuel vapor generated in a fuel tank, an evaporative passage for communicating between the canister and the fuel cut valve and for guiding the fuel vapor to the canister, a fuel cut valve interposed on the evaporative passage at a higher position than a fill up level in the fuel tank for introducing the fuel vapor, an orifice interposed between the evaporative passage and the fuel cut valve, a volume chamber interposed on the evaporative passage downstream of the orifice in the fuel tank for separating a liquid fuel from the fuel vapor, and a liquid level restricting valve communicating with the evaporative passage through a communicating hole provided at the bottom of the volume chamber and disposed below the volume chamber for closing the communicating hole at filling up so as to prevent overfilling.

The fuel vapor processing apparatus according to the present invention further includes a pressure control valve provided in the volume chamber for closing the evaporative passage so as to prevent the liquid fuel from entering the evaporative passage on the canister side.

DETAILED DESCRIPTION OF THE PREFERRED EMBODIMENTS

Figure 1:
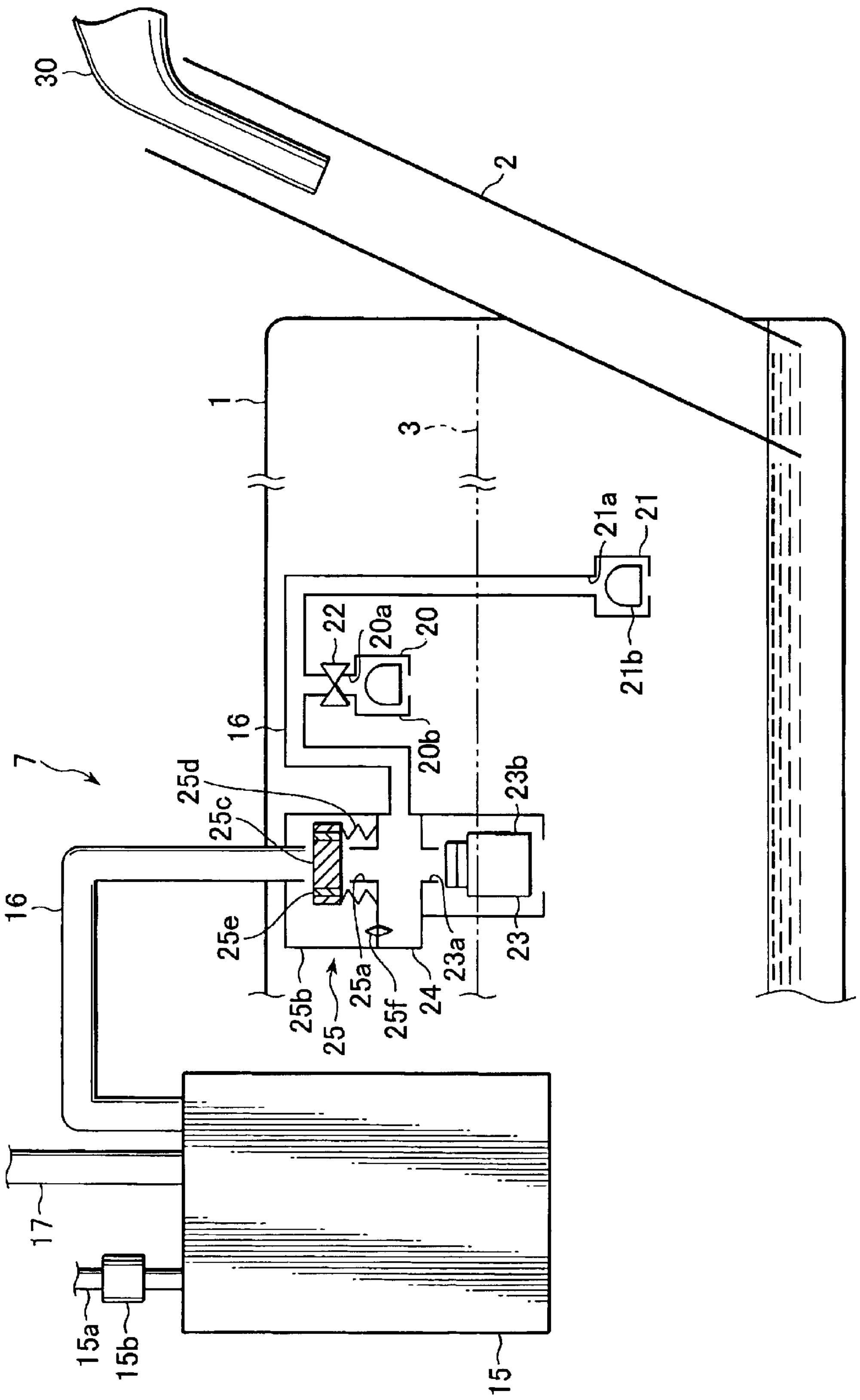
FIG. 1 is a schematic diagram showing a fuel vapor processing apparatus according to a first embodiment of the present invention.
Figure 2:
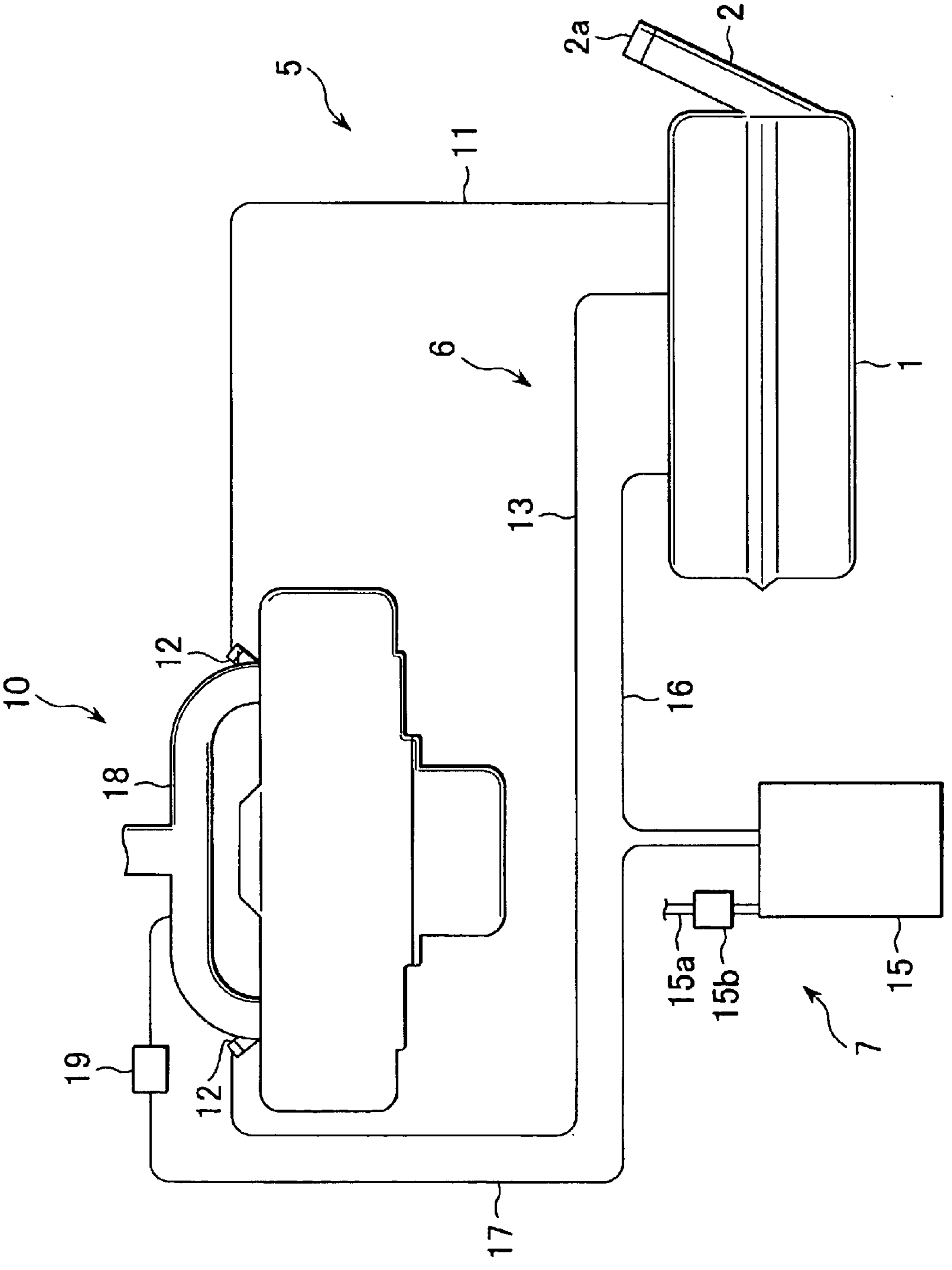
FIG. 2 is a schematic overall view showing a fuel system.

Referring now to FIG. 2, reference numeral 1 denotes a fuel tank and reference numeral 2 denotes a fuel filler pipe for guiding fuel to the fuel tank 1 when opening a fuel filler cap 2*a* for refueling. As shown in FIG. 1, the fuel filler pipe 2 is deep inserted into the fuel tank 1 and the lower end thereof is located below a preestablished fill up level of fuel.

The fuel tank 1 is connected with a fuel delivery line 5 for feeding fuel to an engine 10, a fuel return line 6 for returning fuel from the engine 10 to the fuel tank 1, and a fuel vapor (evaporative gas) line 7 for processing fuel vapor generated in the fuel tank 1.

The fuel delivery line 5 has a delivery passage 11 connecting the fuel tank 1 and the engine 10 and an upstream end thereof is connected with a fuel pump (not shown) inside of the fuel tank 1. Further, fuel pumped up by the fuel pump is delivered to respective fuel injectors 12 of the engine 10 through the delivery passage 11.

The fuel return line 6 is constituted by a fuel return passage 13 connecting the engine 10 and the fuel tank 1. Residual fuel that has not been injected from the injectors 12 is returned to the fuel tank 1.

The fuel vapor line 7 is constituted by an evaporative passage 16 connecting the fuel tank 1 and a carbon canister 15 and a purge passage 17 connecting the canister 15 and an intake manifold 18 of the engine 10. Reference numeral 15*a* denotes an air vent for introducing fresh air to the canister 15 and reference numeral 15*b* denotes a drain valve for opening and closing the air vent 15*a*. Further, reference numeral 19 denotes a purge control valve for controlling passage and shutting-off between the canister 15 and the intake manifold 18.

As shown in FIG. 1, a first fuel cut valve 20 for shutting off fuel is interposed on the evaporative passage 16 in the fuel tank 1 trough an orifice 22. Further, a second fuel cut valve 21 is provided at the end portion of the evaporative passage 16 in the fuel tank 1. Also, a volume chamber 24 is interposed on the evaporative passage 16 on the downstream side of the first and second fuel cut valves 20, 21 in the fuel tank 1. Further, a liquid level restricting valve 23 is interposed on the evaporative passage 16 through the volume chamber 24. Further, a pressure control valve 25 is interposed on the evaporative passage 16 on the downstream side of the volume chamber 24.

The first fuel cut valve 20 is disposed at a position higher than a fill up level 3 in the fuel tank 1. The first fuel cut valve 20 is a float type ever-open valve comprising a communicating hole 20*a* for communicating between the fuel tank 1 and the evaporative passage 16 and a float 20*b* disposed opposite to the communicating hole 20*a*. When the float 20*b* is floated by fuel in the fuel tank 1, the communicating hole 20*a* is closed. Accordingly, when the fuel tank 1 is maintained horizontally, the first fuel cut valve 20 is always exposed to air and the communicating hole 20*a* is in an open condition. As a result, the evaporative passage 16 communicates with the fuel tank 1. On the other hand, when the fuel tank 1 is slanted at a specified angle and more, the first fuel cut valve 20 is dipped in fuel and the communicating hole 20*a* is closed by the float 20*b*.

The second fuel cut valve 21 is disposed below the fill up level 3 in the fuel tank 1 and is disposed in a position exposed to air when the fuel tank 1 is slanted at the specified angle. The second fuel cut valve 21 is constituted by a communicating hole 21*a* for communicating between the evaporative passage 16 and the fuel tank 1 and a float type ever-open valve having a float 21*b* disposed opposite to the communicating hole 21*a*. When the float 21*b* is floated by fuel in the fuel tank 1, the communicating hole 21*a* is closed by the rising float 21*b*. Accordingly, when the amount of the fuel remaining in the fuel tank 1 is larger than a specified amount, the second fuel cut valve 21 is dipped in fuel and the communicating hole 21*a* is closed. On the other hand, when the fuel tank 1 is slanted at a specified angle during hill climbing and the second fuel cut valve 21 is exposed to air, the communicating hole 21*a* is opened and the second fuel cut valve 21 secures the communication between the evaporative passage 16 and the fuel tank 1 in place of the first fuel cut valve 20.

The orifice 22 acts as restricting the amount of flow of evaporative gas passing through the first fuel cut valve 20. In this embodiment, the passage diameter of the orifice 22 is established to 2.0 millimeters.

The liquid level restricting valve 23 is disposed at a position lower than the opening of the fuel filler pipe 2 in the fuel tank 1. Because of this, since the fill up level 3 corresponding to the height of the liquid level restricting valve 3 is lower than the height of the opening of the fuel filler pipe 2, fuel is prevented from being fueled more than the fill up level 3. That is, the liquid surface restricting valve 23 is a float type ever-open valve comprising a communicating hole 23*a* for communicating between the evaporative passage 16 and the fuel tank 1 (volume chamber 24) and a float 23*b* disposed opposite to the communicating hole 23*a*. When the float 23*b* is floated by fuel in the fuel tank 1, the communicating hole 23*a* is closed. On the other hand, in case where fuel in the fuel tank 1 is smaller than the fill up condition by 1 liter or more, the liquid level restricting valve 23 is exposed to air to open the communicating hole 23*a* and as a result the communication is secured between the evaporative passage 16 and the fuel tank 1. Even in case where fuel in the fuel tank 1 is smaller than the fill up condition by 1 liter or more, when the fuel tank 1 is slanted at a specified angle, the valve 23 is dipped in fuel to close the communicating hole 23*a*. As clearly understood from the drawing, the liquid level restricting valve 23 has a larger size than the first and second fuel cut valves 20, 21.

The volume chamber 24 is disposed directly over the liquid level restricting valve 23 and acts as trapping fuel intruding from the fuel cut valves 20, 21 and the liquid level restricting valve 23 to prevent liquid fuel from going to the canister 15 side. When the communicating hole 23*a* is opened, the fuel trapped in the volume chamber 24 is returned to the fuel tank 1 through the liquid level restricting valve 23.

The pressure control valve 25 is constituted by a communicating pipe 25*a*, a valve chamber 25*b* communicating with the volume chamber 25*b* through the communicating pipe 25*a*, a valve body 25*c* touchable to and detachable from the communicating pipe 25*a* in the valve chamber 25*b* and a bellows 25*d* attached to the valve chamber 25*b* and supporting the valve body 25*c* from underneath. The valve body 25*c* has a plurality of hole sections 25*e* outside of the contact surface with the communicating pipe 25*a*. Further, the bellows 25*d* is made of elastic material and has a specified force biasing toward the volume chamber 24 and pushes the valve body 25*c* against the communicating pipe 25*e* with the specified biasing force. In the drawing, reference numeral 25*f* denotes a negative pressure valve whose function is to open when the inner pressure of the fuel tank 1 becomes lower than the inner pressure on the canister 15 side by more than specified value and to communicate between the volume chamber 24 and the canister 15.

In this embodiment, the liquid level restricting valve 23, the volume chamber 24 and the pressure control valve 25 are integrally constituted, forming one unit.

Next, the function of the fuel vapor line 7 at refueling will be described.

As illustrated in FIG. 1, in case where the amount of residual fuel in the fuel tank 1 is small, the first and second fuel cut valves 20, 21 and the liquid level restricting valve 23 are in an open condition.

When the fuel nozzle is inserted into the fuel filler pipe 2 and refueling starts, the liquid level of fuel in the fuel tank 1 rises. When the inner pressure of the fuel tank 1 increases according to the rising liquid level of fuel, the pressure control valve 25 is opened by this inner pressure of the fuel tank 1. As a result, this inner pressure of the fuel tank 1 is swiftly released to the carbon canister 15 side through the evaporative passage 16. That is, when refueling, the evaporative passage 16 functions as a vent passage.

When the refueling further advances, first the second fuel cut valve 21 is dipped in fuel and goes to a closed condition. When the refueling further advances, the liquid level restricting valve 23 is dipped in fuel and is closed in the vicinity of the fill up level 3.

As a result of closing of the liquid level restricting valve 23, the inner pressure in the fuel tank 1 is held at high pressure. Under this condition, the evaporative passage 16 communicates with the fuel tank 1 through the fuel cut valve 20. Since the amount of flow of the evaporative gas through the evaporative passage 16 is restricted by the orifice 22, the release of the inner pressure of the fuel tank 1 to the canister 15 side is alleviated and the inner pressure is maintained to be high.

As a result, the refueling is stopped by the automatic stop function of the fuel nozzle and the over filling can be prevented. The inner pressure of the fuel tank 1 is gradually released to the canister side through the first fuel cut valve 20 and is lowered up to a specified pressure when a specified time elapses after the refueling finishes.

Next, the function of the fuel vapor line during traveling of the vehicle will be described.

When the vehicle makes a normal traveling after the refueling finishes, the evaporative gas generated in the fuel tank 1 is conveyed in the evaporative passage 16 to the canister 15 through at least either of the first and second fuel cut valves 20, 21 and the liquid surface restricting valve 23 according to the liquid level condition of fuel in the fuel tank 1 and treated in the canister 15. That is, during traveling of the vehicle, the liquid level restricting valve 23 also functions as a fuel cut valve.

In case where fuel in the fuel tank 1 is in an approximate fill up condition, mainly the first fuel cut valve 20 is exposed to air and the evaporative gas generated in the fuel tank 1 is processed to the canister 15 side mainly through the first fuel cut valve 20. The amount of evaporative gas conveyed through the evaporative passage 16 is restricted by the orifice 22. When fuel is in an approximate fill up condition, since the relatively small volume of the space occupied with air reduces the generation of evaporative gas, the amount of the processed evaporative gas is enough only with the first fuel cut valve 20.

Further, in case where liquid fuel comes into the evaporative passage 16 through the respective valves 20, 21, 23 due to the movement of the liquid level of fuel, the pressure control valve 25 prevents the liquid fuel from coming out of the volume chamber 24 and the incoming liquid fuel is trapped by the volume chamber 24, as a result being securely prevented from flowing out to the canister side.

According to the first embodiment, since the first fuel cut valve 20 communicates with the evaporative passage 16 through the orifice 20 and also the liquid level restricting valve 23 communicates with the evaporative passage 16 downstream of the orifice 22, the evaporative passage 16 serves as a vent function, that is, a function to release the fuel vapor in the fuel tank 1 when refueling. Further, since the orifice 22 restricts the amount of flow of evaporative gas, the liquid level restricting valve 23 effectively works when refueling to realize the prevention of overfilling of fuel.

Further, since the evaporative passage 16 has two functions, the function of guiding evaporative gas to the canister 15 when the vehicle normally travels, and the function of releasing fuel vapor generated in the fuel tank 1 when refueling, the construction of the fuel vapor processing apparatus can be simplified and as a result, with respect to the prevention of the leakage of evaporative gas, a high reliability can be realized.

Further, since the liquid level restricting valve 23 communicates with the evaporative passage 16, the liquid level restricting valve 23 can be integrated with the volume chamber 24 and the pressure control valve 25 and as a result, the construction of the fuel vapor processing apparatus can be further simplified, this leading to the reduction of manufacturing cost.

Further, since the evaporative passage 16 is connected with the valves 20, 21, 23, 25 and the volume chamber 24 in the fuel tank 1, respectively, there is a smaller possibility of the leakage of evaporative gas.

Figure 3:
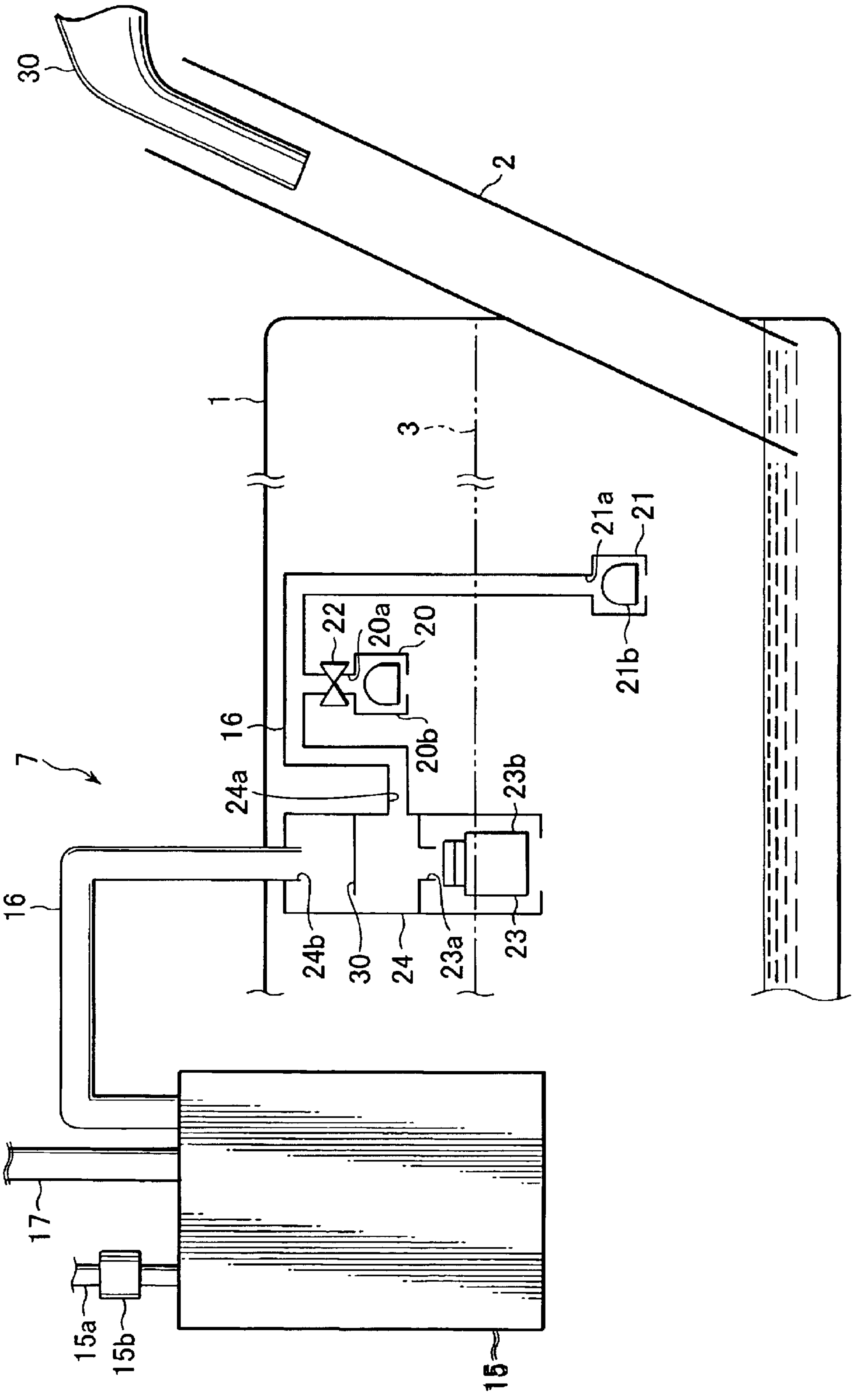
FIG. 3 is a schematic diagram showing a fuel vapor processing apparatus according to a second embodiment of the present invention.

FIG. 3 is a schematic diagram showing a fuel vapor processing apparatus according to a second embodiment of the present invention.

The second embodiment differs from the first embodiment in that the pressure control valve 25 is abolished and a baffle plate is newly attached to the volume chamber 24. Other components identical in both embodiments are denoted by identical reference numbers and are not described in detail.

In the drawing, the volume chamber 24 is integrally formed directly over the liquid level restricting valve 23. The volume chamber 24 communicates with the liquid level restricting valve 23 through the communicating hole 23*a* provided at the bottom thereof. Further, the volume chamber 24 has a communicating hole 24*a* on the lateral side in the vicinity of the bottom thereof and the communicating hole 24*a* communicates with the first fuel cut valve 20 and the second fuel cut valve 21 through the evaporative passage 16, respectively. Further, the volume chamber 24 has a communicating hole 24*b* on the top surface of thereof and the communicating hole 24*b* communicates with the canister 15 through the evaporative passage 16.

Further, at least one baffle plate 30 is attached to the inner wall of the volume chamber 24 between the communicating hole 24*b* and the communicating hole 24*a*. The baffle plate 30 has a labyrinth for blocking the transference of fuel (liquid fuel) from the communicating holes 23*a*, 24*a* to the communicating hole 24*b*.

Fuel vapor (evaporative gas) introduced into the volume chamber through the communicating holes 23*a*, 24*a*is guided to the communicating hole 24*b* through the labyrinth of the baffle plate 30.

By any chance, in case where liquid fuel comes into the volume chamber 24, liquid fuel is trapped by the baffle plate 30 while making a detour around the baffle plate 30 and can be prevented from flowing out to the canister 15 side.

The entire contents of Japanese Patent Applications No. Tokugan 2002-381968 filed Dec. 27, 2002 and No. Tokugan 2003-090741 filed Mar. 28, 2003, are incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A fuel vapor processing apparatus for a vehicle, comprising:

a canister for collecting a fuel vapor generated in a fuel tank;

an evaporative passage for communicating between said canister and said fuel cut valve and for guiding said fuel vapor to said canister;

a fuel cut valve interposed on said evaporative passage at a higher position than a fill up level in said fuel tank for introducing said fuel vapor;

an orifice interposed between said evaporative passage and said fuel cut valve;

a volume chamber interposed on said evaporative passage downstream of said orifice in said fuel tank for separating a liquid fuel from said fuel vapor; and a liquid level restricting valve communicating with said evaporative passage through a communicating hole provided at the bottom of said volume chamber and disposed below said volume chamber for closing said communicating hole at filling up so as to prevent overfilling.

2. The fuel vapor processing apparatus according to claim 1, further comprising:

a pressure control valve provided in said volume chamber for closing said evaporative passage so as to prevent said liquid fuel from entering said evaporative passage on said canister side.

3. The fuel vapor processing apparatus according to claim 1, further comprising:

at least one baffle plate provided in said volume chamber between said evaporative passage on said fuel cut valve side and said evaporative passage on said canister side for forming a labyrinth to trap said liquid fuel.

* * * * *